United States Patent
Yamamoto

(10) Patent No.: US 8,869,929 B2
(45) Date of Patent: Oct. 28, 2014

(54) VEHICLE BODY FRAME OF UTILITY VEHICLE

(71) Applicant: Kawasaki Jukogyo Kabushiki Kaisha, Hyogo (JP)

(72) Inventor: Teruaki Yamamoto, Kakogawa (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 13/728,429

(22) Filed: Dec. 27, 2012

(65) Prior Publication Data

US 2014/0182964 A1 Jul. 3, 2014

(51) Int. Cl.
*B62D 21/18* (2006.01)

(52) U.S. Cl.
CPC ............. *B62D 21/18* (2013.01); *Y10S 180/908* (2013.01)
USPC ........ 180/312; 180/311; 180/908; 180/89.17; 280/781; 280/785

(58) Field of Classification Search
CPC ...... B60K 5/12; B62D 23/005; B62D 21/183; B62D 27/06; B62D 27/065; B62D 21/12; B62D 27/023

USPC ............... 180/311, 312, 908, 89.17; 280/781, 280/785; 296/29, 30, 205

See application file for complete search history.

(56) References Cited

U.S. PATENT DOCUMENTS

| | | | | |
|---|---|---|---|---|
| 2,060,970 | A * | 11/1936 | Belden | 16/404 |
| 5,201,566 | A * | 4/1993 | Mori | 296/192 |
| 6,729,431 | B2 * | 5/2004 | Osuga et al. | 180/312 |
| 7,488,023 | B2 * | 2/2009 | Kapadia et al. | 296/29 |
| 7,677,343 | B2 | 3/2010 | Kitai et al. | |
| 8,499,882 | B2 * | 8/2013 | Tsumiyama et al. | 180/311 |
| 2012/0217078 | A1 * | 8/2012 | Kinsman et al. | 180/69.4 |

FOREIGN PATENT DOCUMENTS

FR 798653 A * 5/1936
WO WO 2004/028885 A1 * 4/2004

* cited by examiner

*Primary Examiner* — Ruth Ilan
(74) *Attorney, Agent, or Firm* — Wenderoth, Lind & Ponack, L.L.P.

(57) ABSTRACT

A vehicle body frame of a utility vehicle comprises: a main frame supporting an engine; and a pair of side frames attached to the main frame by a coupling member on respective left and right sides of the vehicle.

6 Claims, 7 Drawing Sheets

VEHICLE BODY FRAME OF UTILITY VEHICLE

BACKGROUND OF THE INVENTION

1. Field of the Invention

The present invention relates to a vehicle body frame of a utility vehicle.

2. Description of Related Art

U.S. Pat. No. 7,677,343 discloses a vehicle body frame of a utility vehicle. This vehicle body frame has a main frame elongating in the vehicle width direction. The main frame contains a single steel stock extending to its full width of the utility vehicle.

A utility vehicle is assembled by attaching parts, such as an engine, to a vehicle body frame. The distance from the work station for attaching the parts to the center of the vehicle body frame must be large to accommodate the full width of the vehicle body frame. In that case, it becomes difficult to attach to the vehicle body frame the parts attached to the central portion of the vehicle body frame, like the engine. This causes specifically (1) enlargement of a jig for attachment, (2) increase of the full width of a paint line, and (3) reduction of the efficiency of assembling work.

As mentioned above, the above vehicle body frame contains the single steel stock extending to the full width. Therefore, though the vehicle body frame was divided at the time of attaching the parts, the main frame extends to the full width, and this does not solve the above mentioned problem.

SUMMARY OF THE INVENTION

The object of the present invention is to provide a vehicle body frame which can shorten its full width at the time of assembling parts.

The vehicle body frame of the utility vehicle according to the present invention comprises: a main frame supporting an engine; and a pair of side frames combined with the main frame by using a coupling member on the both sides of the vehicle width direction.

The vehicle body frame of the utility vehicle further comprises a partial frame combined with the main frame and/or the side frame by using a coupling member.

In the vehicle body frame, a width of the main frame is formed shorter than a distance between two wheels arranged in right and left.

In the vehicle body frame, the coupling member comprises a bolt and a nut.

In the vehicle body frame, each of plural frames consisting of the main frame, the side frame, and the partial frame has a steel stock which is a channel steel or a square steel, and a tubular member which is fixed to the steel stocks by welding and used for inserting the bolt.

In the vehicle body frame, any two of the frames are fixed together so that an end of the steel stock of one of the frames reaches a side surface of the steel stock of the other of the frames, and an L-shaped bracket for receiving the side surface is fixed to the end.

DETAILED DESCRIPTION OF THE INVENTION

Figure 1:
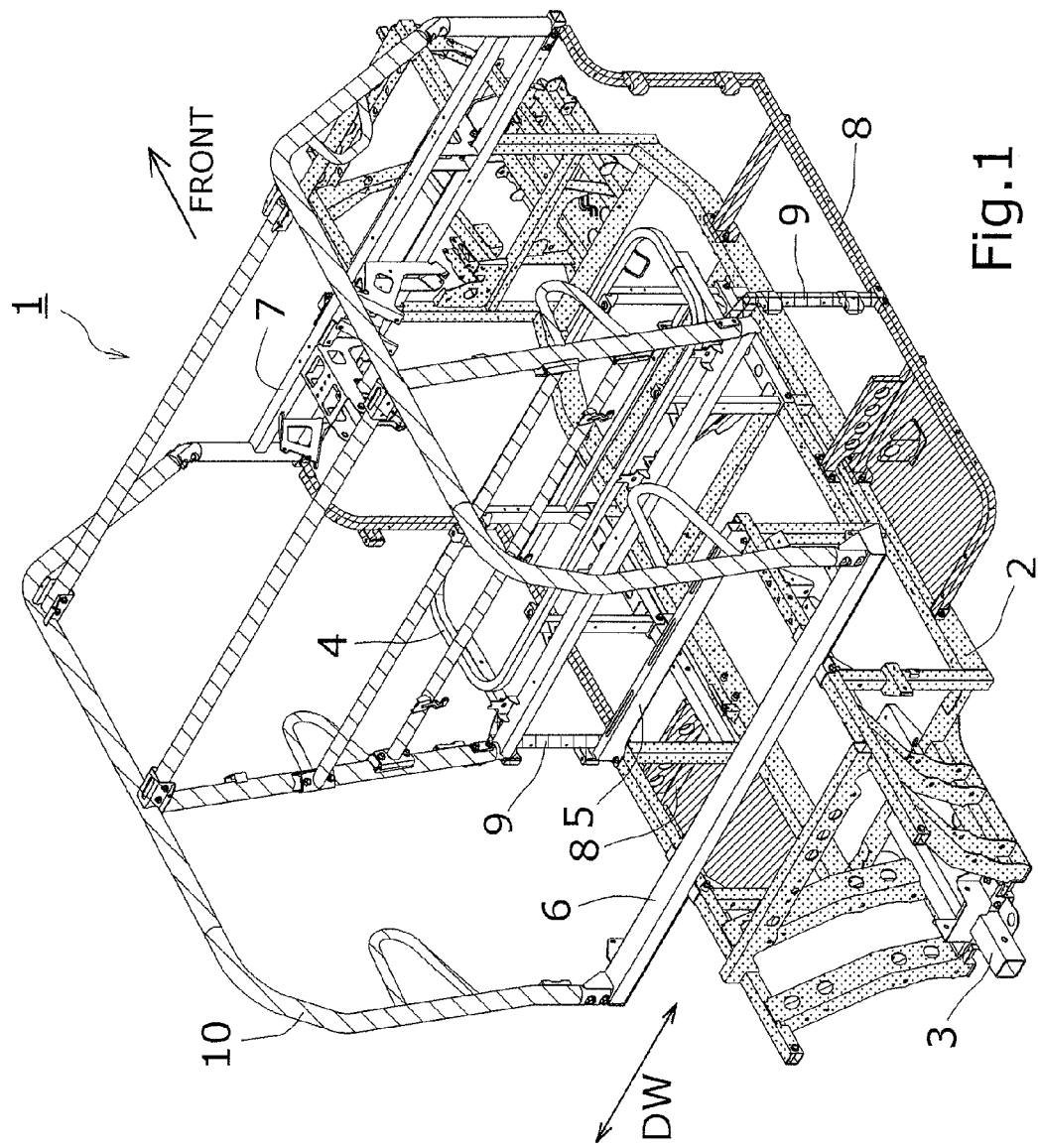
FIG. 1 is a perspective view showing a vehicle body frame of a utility vehicle.
Figure 6:
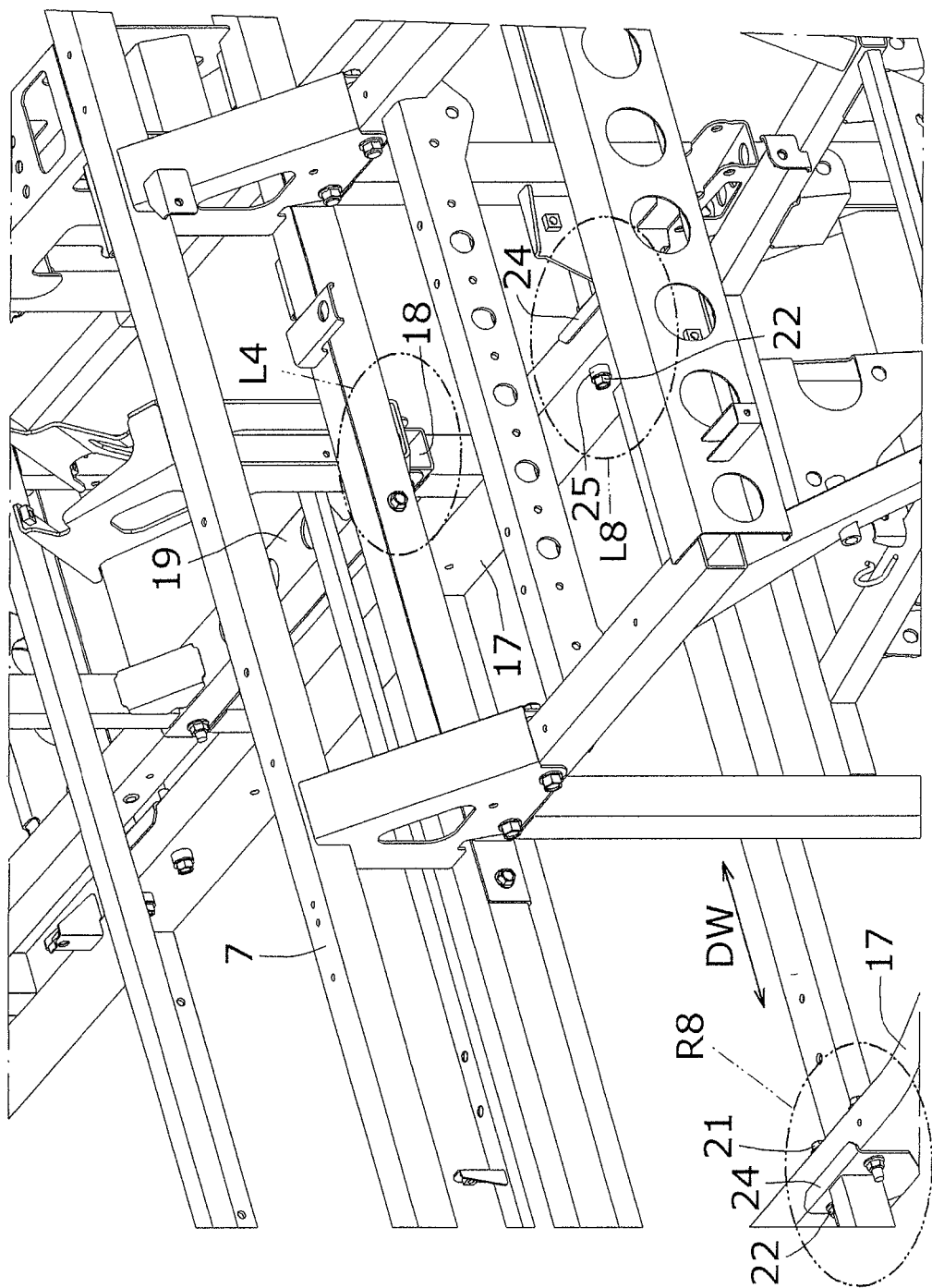
FIG. 6 is a fragmentary perspective view of a vehicle body frame showing three connecting portions.
Figure 7:
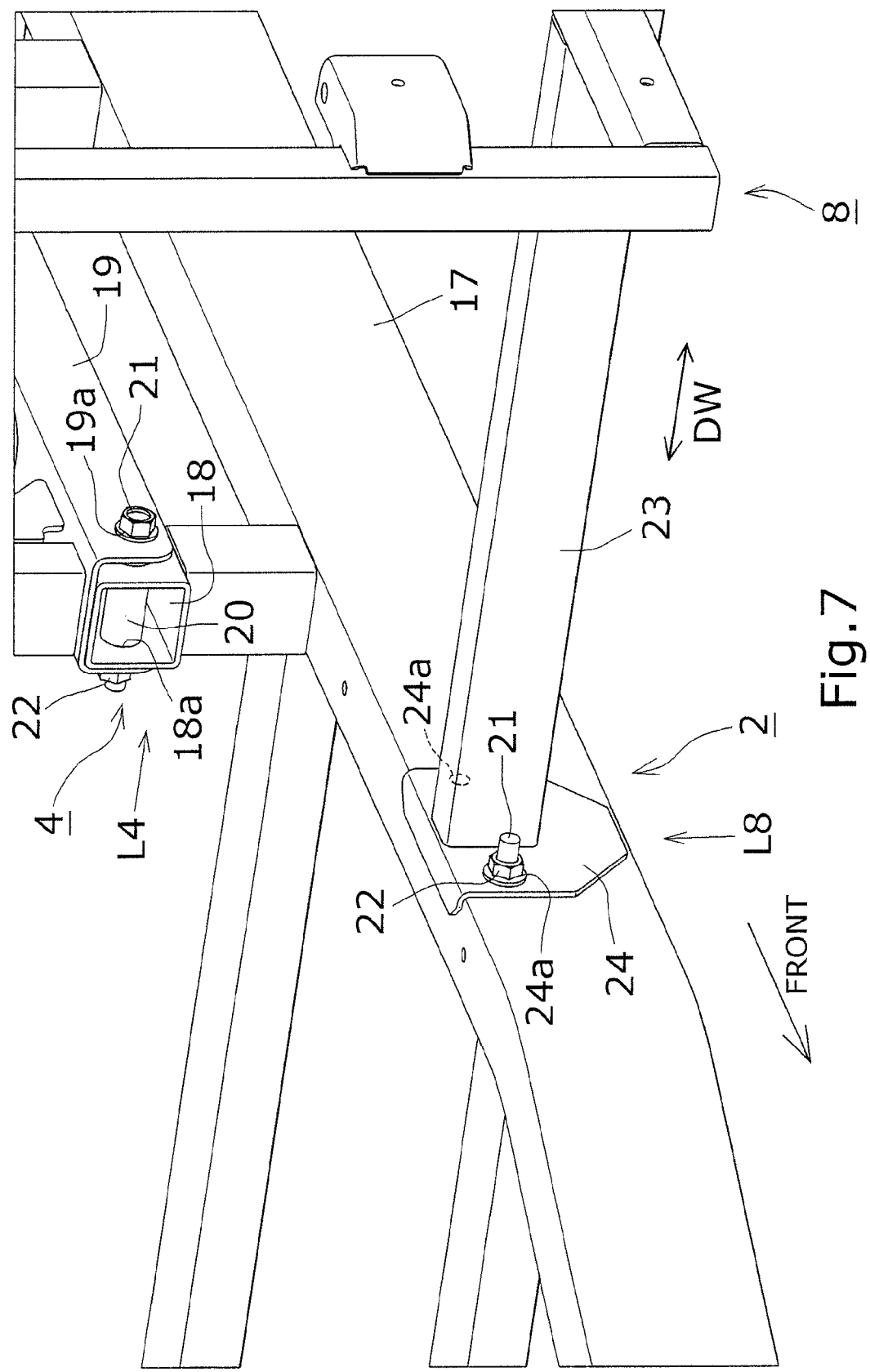
FIG. 7 is a perspective view of connecting portions between frames.

FIG. 1 is a perspective view showing a vehicle body frame 1 of a utility vehicle. As shown by an arrow, the top right of the drawing is the front of a utility vehicle, the bottom left of the drawing is the back of the utility vehicle. The vehicle body frame 1 consists of a main frame 2, an engine mount frame 3, a front seat frame 4, a rear seat frame 5, a carrier frame 6, a front frame 7, and two side frames 8, and two door hinge frames 9. A ROPS (Roll-Over Protective Structures) 10 is attached to the vehicle body frame 1. Each of the frames 2-9 is an independent part, and the vehicle body frame 1 is constituted by combining these frames 2-10 using coupling members. The coupling member consists of a bolt 21 and a nut 22 (FIGS. 6 and 7).

Figure 2:
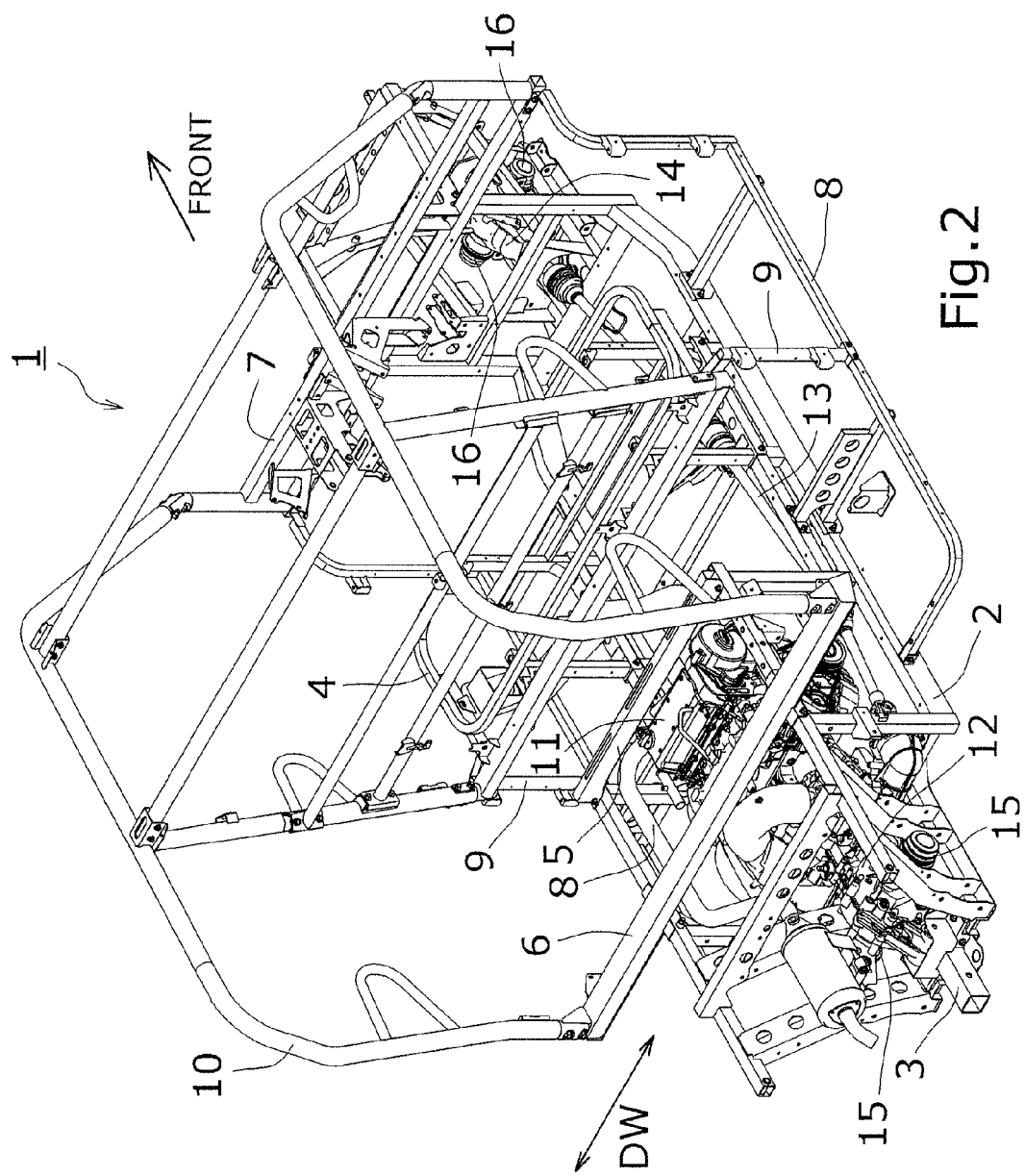
FIG. 2 is a perspective view showing a vehicle body frame and a power transmission mechanism of a utility vehicle.

FIG. 2 is a perspective view showing a vehicle body frame 1 and a power transmission mechanism of a utility vehicle. In FIG. 2, the power transmission mechanism has an engine 11, a transmission 12, a propeller axis 13, and a front final reduction gear 14. The power transmission mechanism is fixed to the vehicle body frame 1. From front of to back of the main frame 2, the front final reduction gear 14, the propeller axis 13, the engine 11, and the transmission 12 are arranged in order. The transmission 12 has two rear axles 15, and a rear wheel is arranged outside the rear axle 15 in the vehicle width direction. The front final reduction gear 14 has two front axles 16, and a front wheel is arranged outside the front axle 16 in the vehicle width direction.

Figure 3:
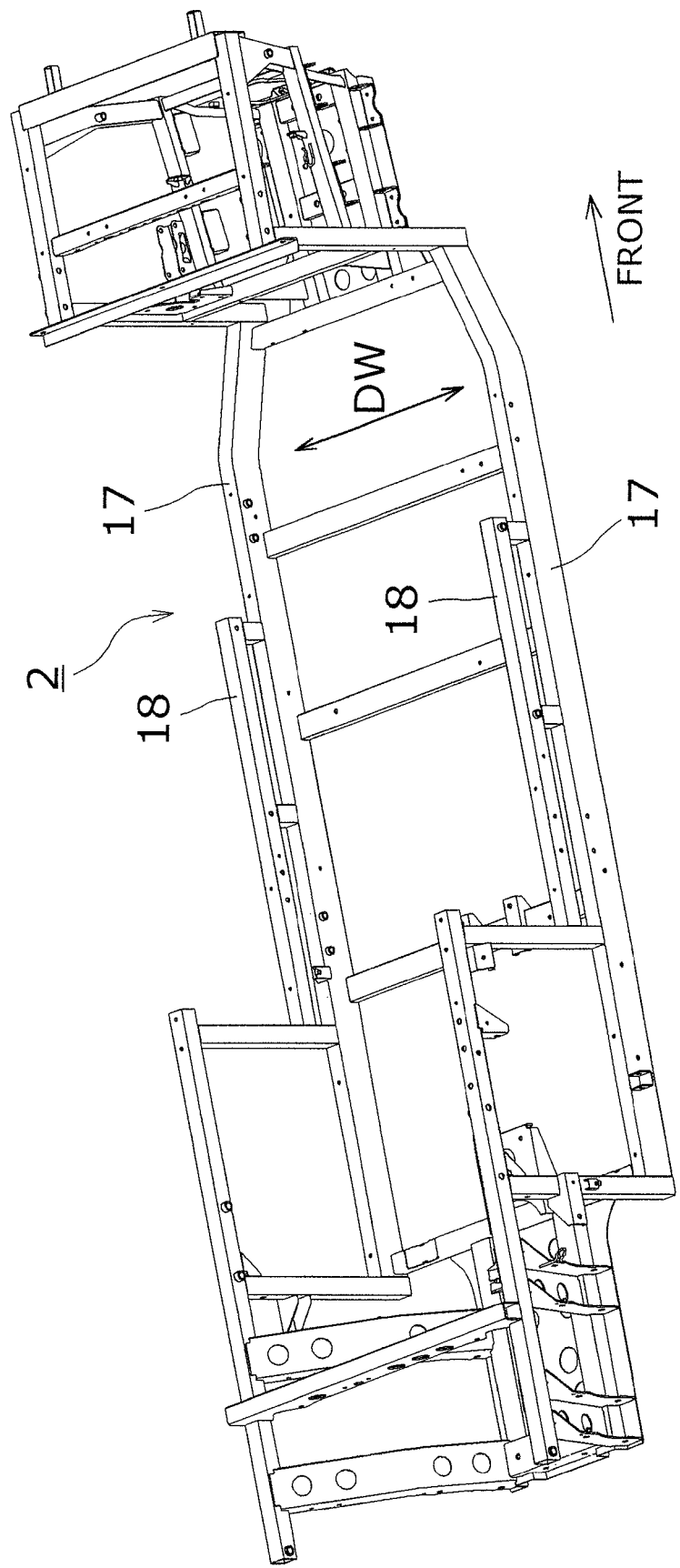
FIG. 3 is a perspective view of a main frame.

FIG. 3 is a perspective view of a main frame 2. The main frame 2 is a structure member which constitutes a framework of the utility vehicle, and mainly consists of a rudder frame having two keel members 17 elongating forward and backward. The width of the main frame 2 is narrower than a distance between the two wheels arranged in right and left.

Referring to FIG. 1, positional relation of the frame 2-10 is described. Each of the two side frames 8 is arranged at each of the both sides of the main frame 2 in the vehicle width direction. In a length direction of the main frame 2, the front frame 7 is located in the forefront, the front seat frame 4 is located in the back of the front frame 7, the rear seat frame 5 is located in the back of the front seat frame 4, the carrier frame 6 is located in the back of the rear seat frame 5, and the engine mount frame 3 is located in the back of the carrier frame 6. The frames 7, 4, 5, 6, and 3 are attached to the main frame 2. The front frame 7 supports parts of an operating system for operation. The front seat frame 4 supports front seats for passengers. The rear seat frame 5 supports the rear seat for passengers. The carrier frame 6 supports a cargo bed arranged at the rear. The engine mount frame 3 supports the engine 11 and the transmission 12. Each of the two door hinge frames 9 is arranged at each of the both sides of the main frame 2 in the vehicle width direction, and has connected the side frame 8 at the bottom and the seat frame 4 at the top. The door hinge frame 9 supports a side door. The ROPS 10 is supported by the front frame 7, the front seat frame 4, and the carrier frame 6. The ROPS 10 constitutes a framework of a cabin of the utility vehicle.

Figure 4:
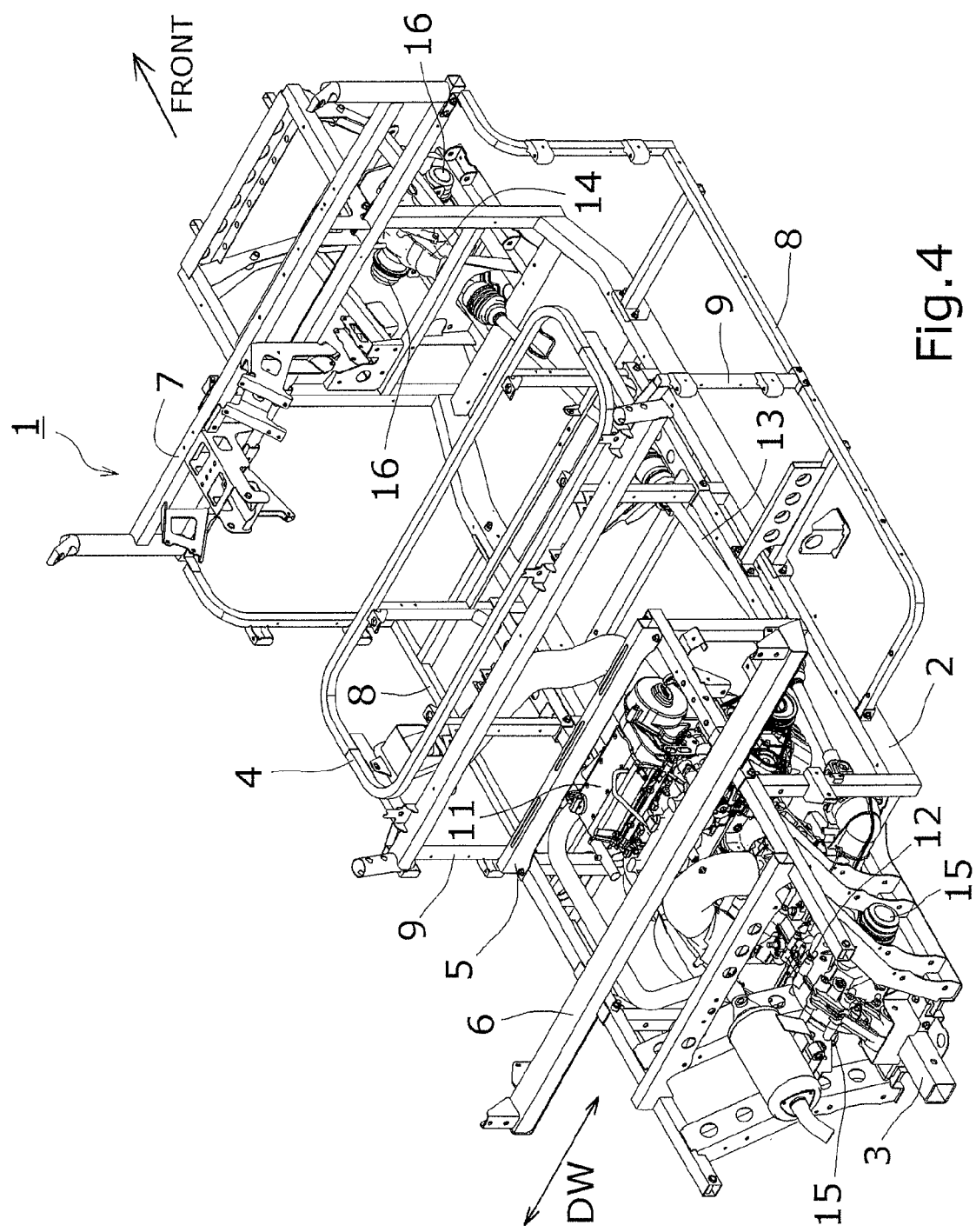
FIG. 4 is a perspective view of a vehicle body frame except ROPS, and a power transmission mechanism.
Figure 5:
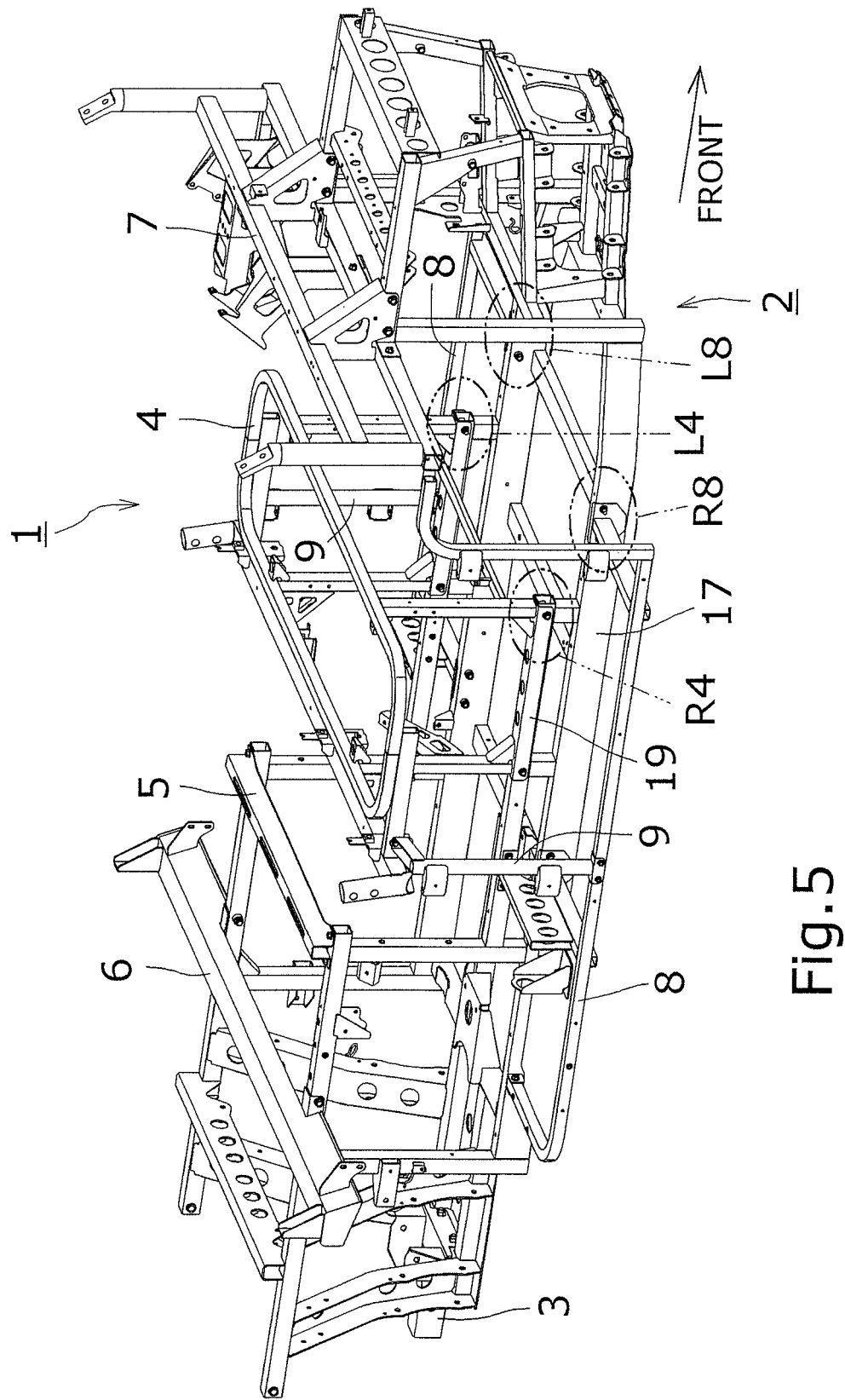
FIG. 5 is a perspective view of a vehicle body frame except ROPS.

Referring to FIGS. 2, 4, and 5, assembling of the vehicle body frame 1 is described. FIG. 4 is a perspective view of a vehicle body frame 1 except a ROPS 10, and a power transmission mechanism. FIG. 5 is a perspective view of a vehicle body frame 1 except a ROPS 10. FIG. 4 is equivalent to FIG. 1, the top right of the drawing is the front of the utility vehicle, and the bottom left of the drawing is the back of the utility vehicle. In FIG. 5, the bottom right of the drawing is the front of the utility vehicle, and the top left of the drawing is the back of the utility vehicle. Roughly, the vehicle body frame 1 is assembled by attaching other frames to the main frame 2.

In FIGS. 4 and 5, firstly, the engine mount frame 3 is attached to the rear end portion of the main frame 2. Next, a group of parts relevant to the engine 11 is attached to the main frame 2 and the engine mount frame 3. This group of parts contains the engine 11, the transmission 12, the propeller axis 13, and the front final reduction gear 14 at least. Next, the front seat frame 4 is attached to the main frame 2. Next, the rear seat frame 5 is attached to the main frame 2. Next, the carrier frame 6 is attached to the main frame 2. Next, the front frame 7 is attached to the main frame 2. Next, the two side frames 8 are attached to the main frame 2. Next, the two door hinge frames 9 are attached to the two side frames 8 and the front seat frame 4. In addition, after each of the frames 4-9 is attached, parts relevant to the attached frames are also attached.

As shown in FIG. 2, finally the ROPS 10 is attached to the front frame 7, the front seat frame 4, and the carrier frame 6.

Referring to FIGS. 5-7, combination of the frames by using a coupling member is described. FIG. 6 is a fragmentary perspective view of a vehicle body frame 1 showing three connecting portions L4, R8, and L8.

FIG. 5 shows four connecting portions R4, L4, R8, and L8, and FIG. 6 shows three connecting portions L4, R8, and L8. The connecting portion R4 is one of the four connecting portions between the front seat frame 4 and the main frame 2, and is a connecting portion located in the right front. The connecting portion L4 is a connecting portion corresponding to the connecting portion R4 in the vehicle width direction, and is a connecting portion located in the left front. The connecting portion R8 is one of the three connecting portions between the side frame 8 of the right and the main frame 2, and is a connecting portion located in the front. The connecting portion L8 is one of the three connecting portions between the side frame 8 of the left and the main frame 2, and is a connecting portion located in the front.

FIG. 7 is a perspective view of connecting portions L4 and L8 between frames. In FIG. 7, the main frame 2 has a square steel 18 elongating in parallel with the keel member 17, and the front seat frame 4 has a channel steel 19 elongating in parallel with the keel member 17. Hereinafter, positional relation of the front seat frame 4 is described on the basis of its posture when the front seat frame 4 is attached to the main frame 2. The channel steel 19 has a U-shaped section, and it is arranged to open its bottom. The square steel 18 is located inside the channel steel 19. The channel steel 19 has two bolt holes 19a penetrated to the vehicle width direction. The two bolt holes 19a are located on the same axle along with the vehicle width direction. On the other hand, the square steel 18 has a square-shaped sectional shape, and has a tubular member 20 elongating in the vehicle width direction. The tubular member 20 is fixed, by welding, to through holes 18a of the vehicle width direction formed in the square steel 18. A Bolt 21 as the coupling member is inserted inside the two bolt holes 19a of the channel steel 19 and inside the tubular member 20, and is fastened by a nut 22. Thus, the channel steel 19 is fixed to the square steel 18. In the vehicle width direction, the width inside the channel steel 19 is larger than the width of the square steel 18, and approximately equal to a length of the tubular member 20. Therefore, the both ends of the tubular member 20 reach inner surfaces of the channel steel 19. Therefore, the bolt 21 can be powerfully fastened in the nut 22, without bending the square steel 18.

In FIG. 7, the side frame 8 has a square steel 23 elongating in the vehicle width direction, and an L-shaped bracket 24 fixed to an end surface of the square steel 23 inside the vehicle width direction. The L-shaped bracket is arranged to the keel member 17 so that two outer surfaces of the L-shaped bracket 24 contact two outer surfaces of the keel member 17. The L-shaped bracket 24 has two bolt holes 24a penetrated to the vehicle width direction. As shown in FIG. 6, the two bolt holes 24a are located forward and backward on the both sides of the square steel 23. On the other hand, the keel member 17 has a square-shaped sectional shape like the above-mentioned square steel 18, and has the tubular member 25 elongating in the vehicle width direction. The tubular member 25 is shown in FIG. 6. The tubular member 25 is fixed, by welding, to through holes of the vehicle width direction formed in the keel member 17. In FIG. 7, a bolt 21 as the coupling member is inserted inside bolt holes 24a of the L-shaped bracket 24 and inside a tubular member, and is fastened by the nut 22. Here, the L-shaped bracket 24 has the two bolt holes 24a, and the keel member 17 also has two tubular members 25 (FIG. 6) in the corresponding position. Therefore, the L-shaped bracket 24 is fixed to the keel member 17 by the two bolts 21. In addition, The end surface outside the vehicle width direction of the tubular member 25 (FIG. 6) is on the outer surface of the keel member 17, and the L-shaped bracket 24 can contact the outer surface of the keel member 17. As shown in FIG. 6, the end surface inside the vehicle width direction of the tubular member 25 projects inside the vehicle width direction than the outer surface of the keel member 17.

The vehicle body frame 1 according to the present embodiment has the following effect, because it has the above-mentioned structure.

(1) The vehicle body frame 1 according to the present embodiment comprises the main frame 2 supporting the engine 11, and the pair of side frames 8 combined with the main frame 2 by using the coupling member on the both sides of the vehicle width direction.

Therefore, the vehicle body frame 1 according to the present embodiment can shorten its full width at the time of assembling the parts.

(2) The vehicle body frame 1 according to the present embodiment further comprises the partial frames 3-7 combined with the main frame 2 and/or the side frame 8 by using the coupling member.

Therefore, the vehicle body frame 1 according to the present embodiment can improve the working efficiency in assembling the utility vehicle by assembling the parts at convenience for attaching the parts.

(3) The width of the main frame 2 is formed shorter than the distance between two wheels arranged in right and left.

Therefore, the vehicle body frame 1 according to the present embodiment can considerably shorten its full width at the time of assembling the parts.

(4) The coupling members consists of the bolt and the nut.

Therefore, the vehicle body frame 1 according to the present embodiment can make assembling work easy and adapt to various specifications.

(5) Each of plural frames consisting of the main frame 2, the side frame 8, and the partial frame 3-7 has the steel stock which is the channel steel or the square steel, and the tubular member which is fixed to the steel stocks by welding and used for inserting the bolt.

When the frames are fixed, the steel stock is put between the bolt and the nut in the state that the tubular member reaches the inner surface of the steel stock. Therefore, the vehicle body frame 1 according to the present embodiment can prevent the steel stock from bending even though using the bolt and the nut for fixing the frames together.

(6) The two frames 2, 8 are fixed together so that the end of the steel stock 23 of one of the frames reaches the side surface of the steel stock (keel member 17) of the other of the frames, and the L-shaped bracket for receiving the side surface is fixed to the end.

Since only a downward load is fundamentally applied in the side frame 8, the load can be borne by the L-shaped bracket 24 instead of a slot-shaped (U-shaped) bracket. Therefore, the vehicle body frame 1 according to the present embodiment can control the weight of the parts required for fixing the frames together.

What is claimed is:

1. A vehicle body frame of a utility vehicle comprising:
   a main frame supporting an engine;
   a front frame supporting parts of an operating system for operation of the utility vehicle;
   a front seat frame supporting a front seat;
   a rear seat frame supporting a rear seat;
   a carrier frame supporting a cargo bed arranged at a rear of the utility vehicle;
   a first side frame attached to a left side of the main frame with a first coupling member;
   a second side frame attached to a right side of the main frame with a second coupling member;
   a first door hinge frame supporting a first side door; and
   a second door hinge frame supporting a second side door;
   wherein:
   the front frame, the front seat frame, the rear seat frame, and the carrier frame are attached to the main frame,
   the first door hinge frame is arranged at the left side of the main frame, a bottom of the first door hinge frame is connected to the first side frame, and a top of the first door hinge frame is connected to the front seat frame,
   the second door hinge frame is arranged at the right side of the main frame, a bottom of the second door hinge frame is connected to the second side frame and a top of the second door hinge frame is connected to the front seat frame, and
   each of the front frame, the front seat frame, and the carrier frame is wider than the main frame in a lateral direction of the utility vehicle.

2. The vehicle body frame of the utility vehicle according to claim 1,
   further comprising a partial frame attached to the main frame with a third coupling member.

3. The vehicle body frame of the utility vehicle according to claim 2,
   wherein a distance between a left wheel of the utility vehicle and a right wheel of the utility vehicle is greater than a width of the main frame in the lateral direction of the utility vehicle.

4. The vehicle body frame of the utility vehicle according to claim 2,
   wherein at least one of the first coupling member, the second coupling member and the third coupling member comprises a bolt and a nut.

5. The vehicle body frame of the utility vehicle according to claim 4,
   wherein the main frame has a steel stock which is a channel steel or a square steel, and has a tubular member which is fixed to the steel stock by welding and is configured to receive at least one of the bolt of the first coupling member, the bolt of the second coupling member and the bolt of the third coupling member.

6. The vehicle body frame of the utility vehicle according to claim 5,
   wherein the main frame and one of the first side frame and the second side frame are fixed together so that an end of the one of the first side frame and the second side frame reaches a side surface of the steel stock of the main frame, and
   wherein an L-shaped bracket for receiving the side surface is fixed to the end of the one of the first side frame and the second side frame.

* * * * *